United States Patent
Fatehi et al.

[19]

[11] Patent Number: 6,002,818
[45] Date of Patent: Dec. 14, 1999

[54] FREE-SPACE OPTICAL SIGNAL SWITCH ARRANGEMENT

[75] Inventors: Mohammad Taghi Fatehi, Middletown Township, Monmouth County; Joseph Earl Ford, Oakhurst Township, Monmouth County, both of N.J.

[73] Assignee: Lucent Technologies Inc, Murray Hill, N.J.

[21] Appl. No.: 08/985,618

[22] Filed: Dec. 5, 1997

[51] Int. Cl.⁶ .................................................. G02B 6/26
[52] U.S. Cl. .................. 385/17; 385/16; 385/46; 385/33
[58] Field of Search .................. 385/16, 17, 18, 385/19, 20, 21, 22, 23, 24, 33, 46, 47

[56] References Cited

U.S. PATENT DOCUMENTS

| | | | |
|---|---|---|---|
| 5,037,173 | 8/1991 | Sampsell et al. | 385/17 |
| 5,440,654 | 8/1995 | Lambert, Jr. | 385/17 |
| 5,524,153 | 6/1996 | Laor | 385/16 |
| 5,621,829 | 4/1997 | Ford | 385/22 |

*Primary Examiner*—Phan T. H. Palmer

[57] ABSTRACT

A free-space N by M, where N and M>1, optical signal switch (OXC) requires only transmitter beam steering for controlling to which receiver an optical signal from a transmitter is directed. In a preferred embodiment the transmitters handle single mode optical signals and the receivers handle multimode optical signals. The OXC may optionally include a fixed optical unit implemented using either a single fixed shared lens or a plurality of M optical elements for further directing each of the M optical signals to their respective receivers.

15 Claims, 6 Drawing Sheets

FREE-SPACE OPTICAL SIGNAL SWITCH ARRANGEMENT

TECHNICAL FIELD OF THE INVENTION

This invention relates to free-space optical switch arrangements and, more particularly, to a free-space optical switch array arrangement utilizing only optical transmitter beam steering.

BACKGROUND OF THE INVENTION

Single mode (SM) fiber, with it's virtually unlimited bandwidth, has become the telecommunications standard despite the precise alignment tolerances and corresponding high components costs. However, the alignment tolerances for multimode (MM) fiber is typically a factor of 10 or more looser than for SM fiber. Unfortunately, the standard 62.5 micron core MM fiber has a limited bandwidth-distance product of typically 160 and 600 MHz-km. This means that a 10 GHz signal would degrade unacceptably after transmission over a distance of 16 to 60 meters.

An optical switch array (also referred to herein as an optical cross connect [OXC] or optical crossbar) is used to provide switchable cross connects between optical fibers. One prior art optical crossbar, illustratively shown in FIG. 1, is described in U.S. Pat. No. 5,524,153 issued on Jun. 4, 1996 to the Astarte company. This optical crossbar provides an array of free-space optical connections between collimated input and output fibers. With reference to FIG. 1, this system enables an input fiber, e.g., 101, to be selectively switched to any output fiber, e.g., 110. The switching is accomplished using a piezo-electric lateral actuator (not shown) which laterally translates, 102, the input fiber 101, relative to the axis of a collimation lens, e.g., 103, thereby enabling the optical beam, 104, to be steered or directed to the collimation lens, e.g., 105, where another piezo-electric actuator has translated, 111, fiber 110 into the correct location to receive optical beam 104.

Undesirably, these prior art optical crossbars (OXC) have required beam steering units at each of the input and output fibers. Beside being costly, the physical size of these beam steering units affect the overall size of the optical crossbar. With the continued emphasis on cost reduction and miniaturization, what is desired is an optical crossbar that is lower cost and smaller.

SUMMARY OF THE INVENTION

In accordance with the present invention, a free-space N by M where N and M>1, optical signal switch arrangement (OXC) is disclosed which requires only transmitter beam steering. More particularly, our free-space optical signal switch arrangement comprises N optical signal transmitters each for outputting an optical signal, M optical signal receivers each for receiving an optical signal, and N controllable optical signal steering units each associated with a transmitter, for receiving an optical signal from that transmitter and for controlling to which of the M receivers that optical signal is directed. In a preferred embodiment the transmitters accept single mode optical signals and the receivers accept multimode optical signals.

According to another embodiment, the OXC includes a fixed optical unit, interposed between the N controllable optical signal steering units and the M receivers, for further directing each of a plurality of optical signals to their respective receivers. The optical unit may be implemented using a single fixed shared lens or a plurality of M optical elements for further directing each of the M optical signals to their respective receivers.

In other embodiments, one or more transmitters is selected from a group of optical signal sources including at least a single mode fiber, a multimode fiber, a laser or a light emitting diode and the one or more receivers is selected from a group of optical signal units including at least a single mode fiber, a multimode fiber or an optical signal detector.

In yet other embodiments, the transmitter and optical signal steering unit combination is selected from a group including at least (1) a fixed collimated light beam and tilting mirror, (2) a fixed collimated light beam and rotating prism, (3) a tiltable collimated beam and lens combination, (4) a light source that is laterally translatable with regards to a fixed lens, or (5) a fixed light source and laterally translatable lens.

DETAILED DESCRIPTION

In the following description, each item or block of each figure has a reference designation associated therewith, the first number of which refers to the figure in which that item is first located (e.g., 210 is located in FIG. 2).

Figure 2:
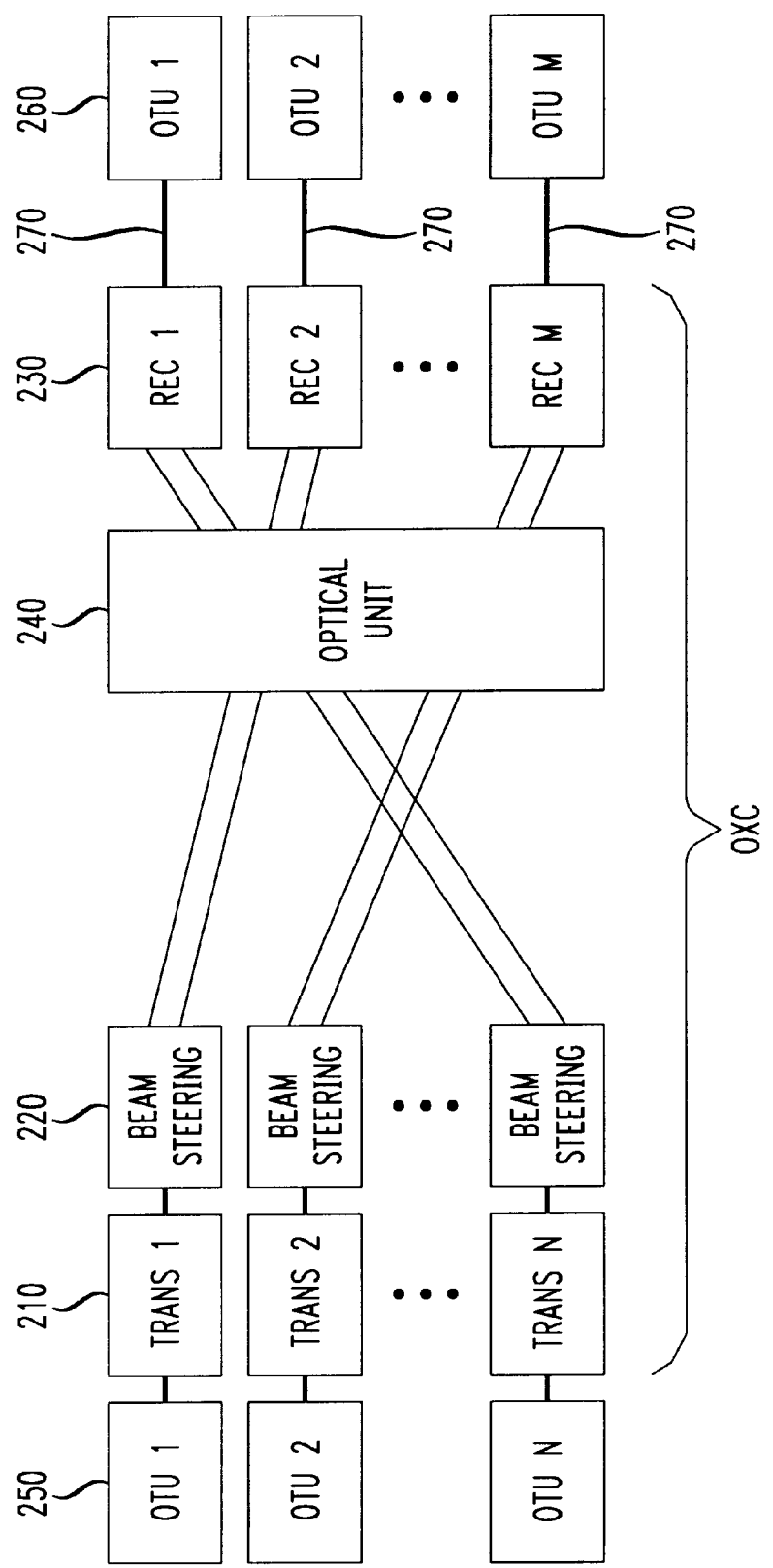
FIG. 2 shows an illustrative block diagram of an optical signal crossbar switch in accordance with the present invention.

With reference to FIG. 2, there is shown an illustrative block diagram of an optical signal crossbar switch in accordance with the present invention. Our optical crossbar (OXC) is shown to include a plurality N of transmitters 210, each having an associated controllable beam steering unit 220 and receiver 230. Each of the beam steering units 220, operating under control of an external control signal, steer the optical beam from an associated transmitter to any of the M receivers. As will be discussed in a later paragraph, the OXC may optionally include an optical unit 240 which may further focus and direct the optical signals to the M receivers.

In many network applications, optical translator units (OTU) 250 and 260 are being used to interface optical signals to the OXC. These OTUs are essentially repeaters which accept an input optical signal within a range of wavelengths and generate an output optical signal at another wavelength. For example, the OTUs 250 would be used to convert the optical signals used by the network to the optical signal type utilized by the OXC and OTUs 260 would be used to convert the OXC optical signals back to the optical signal type used by the network. The OTUs may convert the optical wavelengths of the optical signal or may convert single mode (SM) signals into multimode (MM) signals or vice versa. Thus, the use of OTUs makes it easy for a network service provider to mix-and-match equipment from several venders, and also relieves problems from multiple component passband narrowing.

We have recognized that while SM fiber is used for optical transmission over the network, the OTUs 250 and 260 would enable design freedom with respect to fiber type used within the OXC. Thus, for example, we may use MM fiber for short distance optical links within the OXC and use the OTUs 260 to convert the signals to a SM signal for transmission over the SM fiber of the connecting network. Using this approach, in accordance with the present invention, our OXC is designed to reduce the number of high cost of single mode components utilized.

As previously described, in one optical network application SM fiber is used to carry OC-192 (10 GHz) data. In comparison, standard MM fiber has a limited bandwidth-distance product typically between 160 and 600 MHz-km. This means that a 10 GHz signal traveling over MM fiber would degrade unacceptably after transmission over a distance of 16 to 60 meters. The increased range in the SM fiber over that of the MM fiber is because the SM beam is smaller (i.e., it has a smaller focus diameter) permitting only a single optical mode signal. Since the single mode fiber uses only a single optical mode signal, the signal can propagate further along the fiber before it has dispersed to the point where crosstalk becomes problematic for a receiver.

We have recognized that because the optical connections within the OXC are all short compared to the 16 meter limit of MM beam, it is fully acceptable to use MM fiber links. Moreover, the relaxed alignment tolerance of multimode (MM) fiber, which is typically a factor of 10 or more better than that of SM fiber, enables a OXC design which is cheaper and smaller. For example, in accordance with the present invention, the use of MM fiber in a receiver of the OXC eliminates the need for receiver beam steering (i.e., the use of lens 105 and lateral translation mounts 111 of the previously referenced Astarte patent). As a result, with reference to FIG. 2, only transmitter beam steering 220 is utilized in the OXC of the present invention. This means that our OXC using only transmitter beam scanning 220, MM receivers 230 (e.g., MM fibers), with OTUs 260 to convert MM signals to SM signals can be made to work sufficiently well to interface to networks that use input and output SM fibers.

Figure 1:
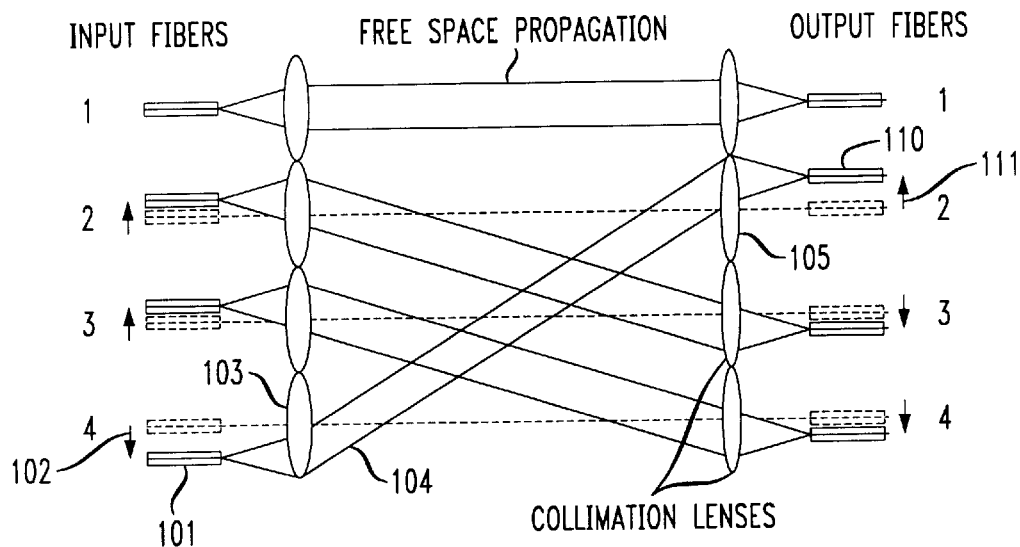
FIG. 1 shows an illustrative block diagram of a prior art optical signal crossbar switch.
Figure 3:
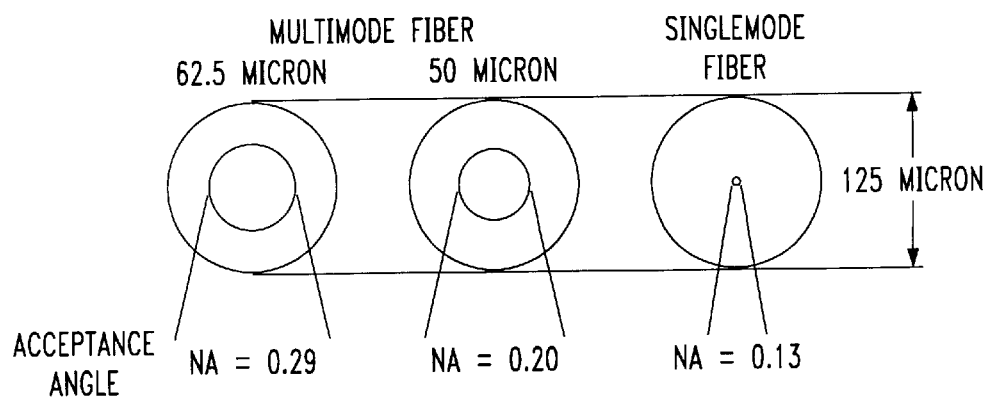
FIG. 3 shows an illustrative diagram which compares the diameter and aperture angle of a SM and MM fiber.

With reference to FIG. 3, we describe how the use of a SM signals at the transmitter 210 and MM signals at the receiver 250 relaxes tolerances in the design of the OXC of FIG. 2. As shown in FIG. 3, MM fiber, typically in use today, has a core diameter of 62.5 or 50 microns while SM fiber has a 10 micron core diameter. The associated optical signal acceptance angles of the MM fibers are typically 0.29 and 0.20, respectively, and 0.13 for the SM fiber. Consequently, optical signals transmitted from an SM fiber has a propagating mode field diameter of about 10 microns, while MM fiber has a propagating mode field diameter of about 50 to 63 microns (depending on the particular fiber and wavelength). Moreover, the greater acceptance angle of the MM fiber makes a MM to MM fiber connection less susceptible to misalignment and signal loss than a SM to SM fiber connection.

We have noted, however, that it may be preferable to use a mixed mode approach in our OXC design, that is, using an SM optical signal input (transmitter) to a MM optical signal output (receiver). With reference to FIG. 2, in one embodiment of our invention, our OXC switch uses SM inputs from standard SM type OTUs 250, the output of the OXC connects over MM fiber 270 to the output OTUs 260. The output OTUs 260 can convert the MM signal to a SM signal required by the connecting network. If the output OTUs 260 are packaged as part of the OXC, then the manufacturer has full freedom to define whatever fiber is used internally to the OXC, provided it meets all specifications. If the OXC is designed so as to allow OTUs from external venders, then the OXC output must be compatible with whatever standards are defined for those OTUs. It may be possible for certain types of MM fibers 270 to be used within the OXC to meet the desired criterion, provided the mode field diameter is sufficiently small.

Figure 4:
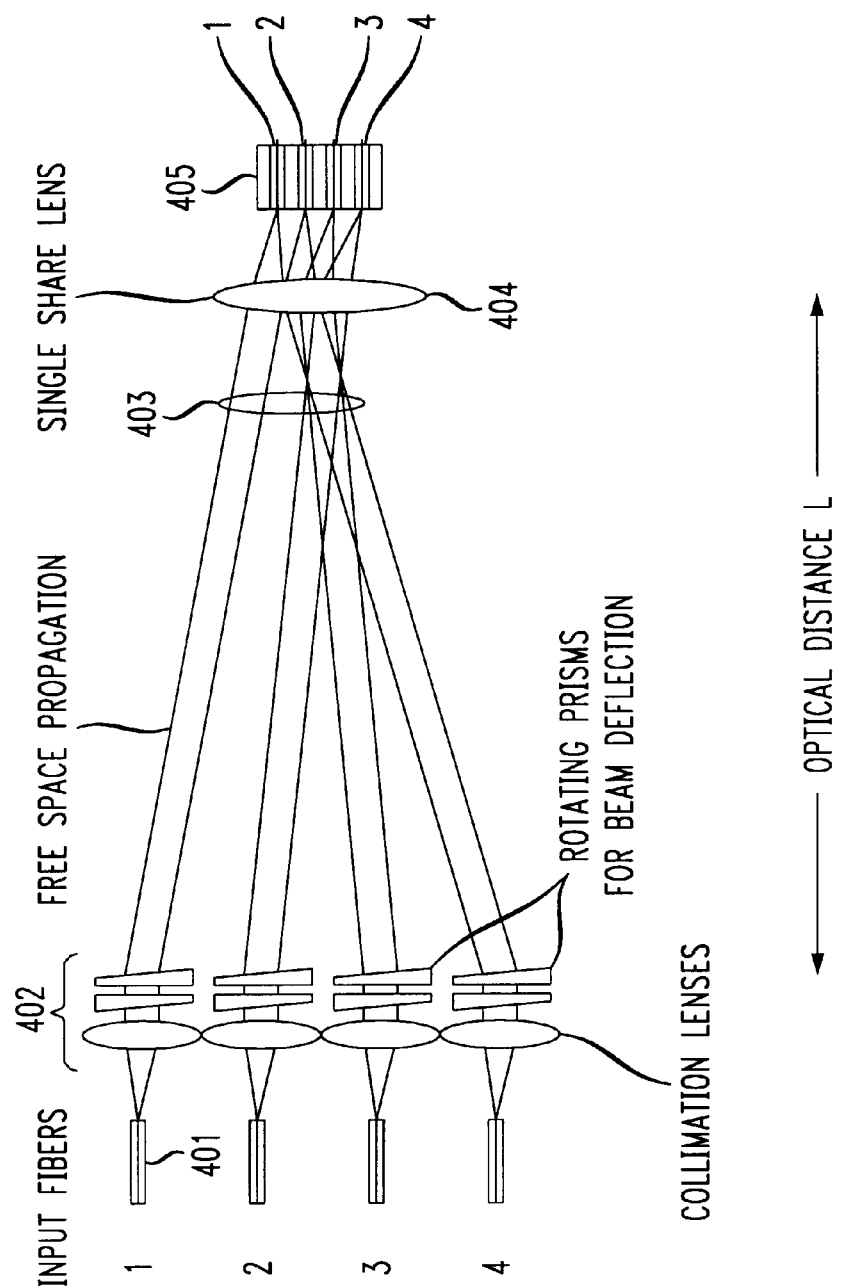
FIG. 4 shows a specific embodiment of an optical crossbar switch of FIG. 1.
Figure 9:
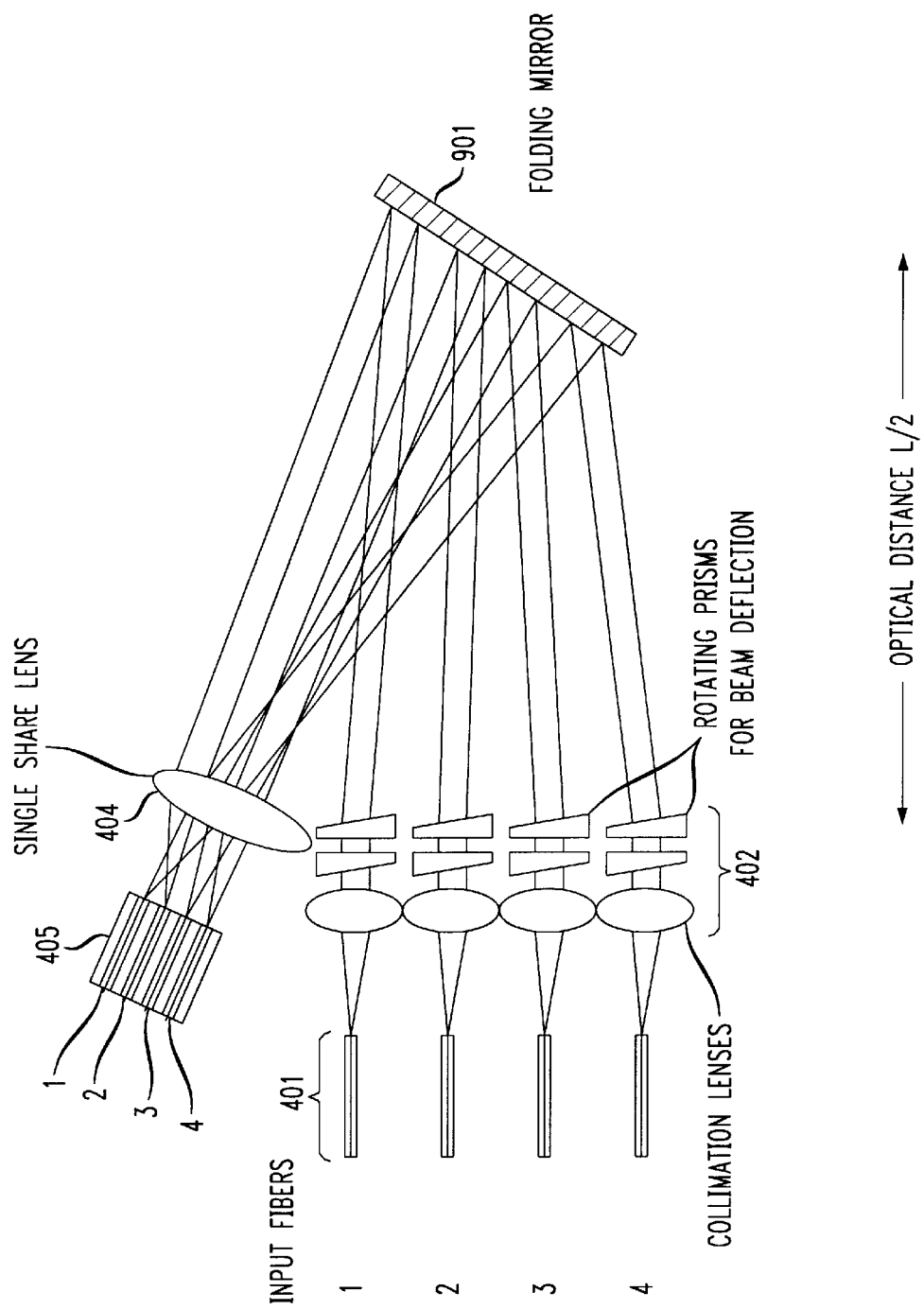
FIG. 9 shows a specific embodiment of a crossbar switch using a folding mirror.

It should be noted that while FIGS. 2, 4, and 9 show a 1-D array of inputs, 1-N, and outputs, 1-M, in practice 2-D arrays and 2-axis beam steering actuators can, preferably, be used.

With reference to FIG. 4, there is shown one illustrative embodiment of our N×M free-space prism-scanner based crossbar OXC. The preferred characteristics of a scanner for this type of OXC application is (1) high resolution (2) wide scan angle range, (3) low aberration, and especially (4) small size relative to the collimated beam diameter. The last point is important in that a collimated beam can only propagate a limited distance relative to it's diameter before aberrations and diffraction effects cause unacceptable losses or crosstalk. So the smaller the pitch of the scanners (fiber, collimator, and drive motors) relative to the collimated beam diameter, the greater the number of inputs which can be switched.

We have noted that as the size of the crossbar increases, the optical distance L over which the crossbar needs to transmit the optical signal becomes longer than the length which is compatible with reasonably efficient and reliable single mode fiber connections. In such a situation, it is advantageous to use a single mode input source (e.g., a SM fiber) and a multimode fiber output destination (e.g., a MM fiber).

With joint reference to the OXC of FIGS. 2 and 4, the transmitters 210 of FIG. 2 are represented by input fibers 401 of FIG. 4, the beam steering units (also referred herein as a scanner) 220 are shown implemented using prism scanner units 402, the optional optical unit 240 represented as using a single lens 404, and the receivers 230 are represented by output fibers 405.

Each of the prism scanner units 402 include a collimation lens and rotating prisms to provide beam deflection. The rotating prism may be of the type described in the U.S. Pat. No. 5,621,829, issued on Apr. 15, 1997 to J. E. Ford. Such a scanner has several advantages for this application: it is low aberration, allows large scanning angles, and can make full use of the drive motor accuracy. More importantly, it may be possible to use more of the clear aperture of the collimated beam, as shown in FIG. 4, provided that a means for rotation can be either miniaturized or positioned out of the beam path. Therefore it may be feasible to make a OXC switch using this design with macroscopic bulk optic components.

We have noted that if the optical distance, L, and the numerical aperture of the receive fiber are sufficiently large, then no controllable beam steering is needed at the receiver 405 location to implement an N by M OXC switch. To decrease the volume occupied by the OXC, another embodiment of the invention (shown in FIG. 9) shows a folded system, where the transmitter array and the receive bundle are on the same side and a mirror is used to fold the optical path.

Shown in FIG. 4 is one embodiment of our invention where optional optical unit (240 of FIG. 2) is implemented using a single fixed shared lens 404 which focuses and further directs the received beams 403 onto their respective receiver units (230 of FIG. 2) using "receiver" fibers 405. To maximize the efficiency and reduce losses and aberrations, the receive fiber bundle 405 is placed centrally with respect to transmitter fiber array 401. The single shared receive lens 404 focuses all incoming parallel beams onto the polished face of one of the receiver fibers 405, depending on the location of the beam on the shared lens 404 and the angle that the beam makes with the optical axis of lens 404. The receiver fibers 405 may be bundled and polished in the manner described in the previously referenced Ford patent.

Since the position of the lens is fixed when the unit is constructed, it does not have to be repositioned when the transmitter beam scanning is changed. This eliminates the costly actuators and control circuits needed to produce receiver beam steering as in the prior art Astarte OXC switch. Thus, for an N×M switch our OXC switch requires only beam steering or scanning units 402 at the N inputs rather than requiring beam steering at both the N inputs as well as the M outputs as in the Astarte OXC.

While the OXC of FIG. 4 is described as using prism scanners 402 for beam steering (or scanning), it should be noted that the fiber translating actuators described in the Astarte patent could also be utilized for this function. More generally, the translating actuators can be used to either translate a collimated input beam relative to the lens or to translate the lens relative to the beam using a small electric motor. Alternatively, other scanning techniques such as using a fixed collimated beam and tilting mirror, or a tiltable collimated beam and lens combination can also be utilized.

Additionally, while the transmitters (210 of FIG. 2) have been illustratively implemented using input fibers 401 (which may be either multimode fiber or, preferably, single mode fibers), it should be understood that the transmitters may also be implemented using other types of optical signal sources such as a laser or a light emitting diode, etc.

Figure 5:
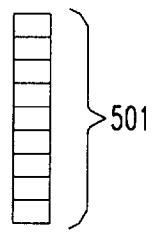
FIG. 5 shows the receivers implemented using a stack of optical signal detectors.
Figure 6:
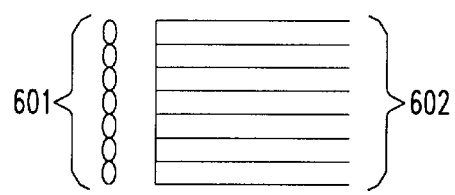
FIG. 6 shows the receivers as each including a lens to focus each optical signal onto its associated fiber of the fiber bundle.
Figure 7:
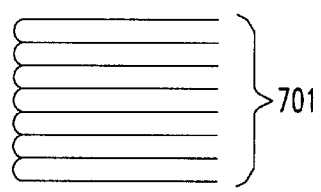
FIG. 7 shows the receivers as each including a fiber of the fiber bundle, each fiber having a lens formed on an end thereof for focusing an optical signal to that fiber, FIG. 8. shows the receivers as each including beam directors to focus each optical signal onto its associated fiber of the fiber bundle.
Figure 8:
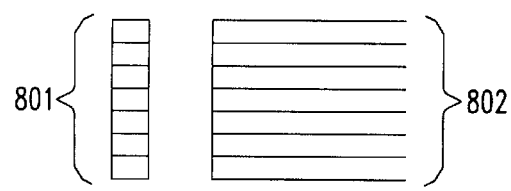

Moreover, while the receivers (230 of FIG. 2) is described as being implemented using output fibers 405 (which may be either single mode fiber or, preferably, multimode fibers), the receivers may also be implemented using many types of optical signal detectors, as shown by 501 of FIG. 5. While one dimensional (1-D) arrays of receivers are shown in these figures, it should be noted that when the number of receivers is large, the use of a two dimensional (2-D) receiver array is preferable to a 1-D array receiver embodiment Additionally, the optical unit (240 of FIG. 2) and receivers (230 of FIG. 2) combination may be implemented using (1) a plurality of individual fixed lenses 601, one for each fiber(or detector) of fiber bundle 602, as shown in FIG. 6; (2) a bundle of fibers (SM or MM type) 701, each having a hemispheric focusing lens formed on its end, as shown in FIG. 7; or (3) a beam steering unit 801 and fiber bundle (SM or MM type), as shown in FIG. 8. Again, while a one dimensional (1-D) array of fiber bundles (and lenses) is shown in these figures, it should be noted that when the number of fibers (and lenses) is large, the use of a two dimensional (2-D) receiver array is preferable to a 1-D array of fibers (and lenses).

Shown in FIG. 9 is an alternative geometry for the OXC switch, which may be the preferred embodiment. As shown, the arrangement includes all the components of FIG. 4 in addition to a folding mirror 901. The separate transmitter and receiver device arrays, 401 and 405, can be combined into a single plane by placing mirror 901 halfway between the two, and using reflective geometry. If desired, the input and output fiber arrays can also be interleaved.

Figure 10:
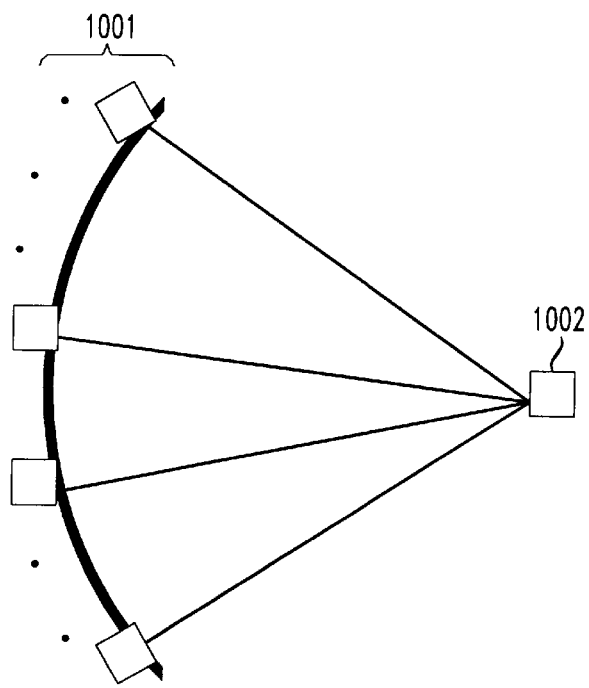
FIG. 10 shows a crossbar switch arrangement utilizing modular transmitter units and a single receiver unit.

The OXC arrangement of FIG. 9 reduces the length of the OXC almost by half over the OXC of FIG. 4. Additionally, part of the beam deflection can be accomplished by a fixed bias prism (not shown) to center the scan range on the output fiber 405 array. It should be noted that a prism can also be used to center the scan range in the other embodiments In accordance with another aspect of the invention, to maximize the spatial efficiency of the system in order to build very large fabrics, one may utilize many modular transmitter arrays plus a single very large receiver module. Such an arrangement is shown in FIG. 10 where a plurality of transmitter arrays 1001 and one receiver module 1002 are shown. Such an arrangement enables the number of inputs N to the OXC switch to increase in a modular manner. As shown, each of the illustrative four transmitter arrays can be located on a circular surface of with the receiver array or bundle essentially at the center of the circular. If the transmitter module array is a two dimensional array then the transmitter modules can be located on a spherical surface and the receiver array located at the center of the sphere.

Figure 11:
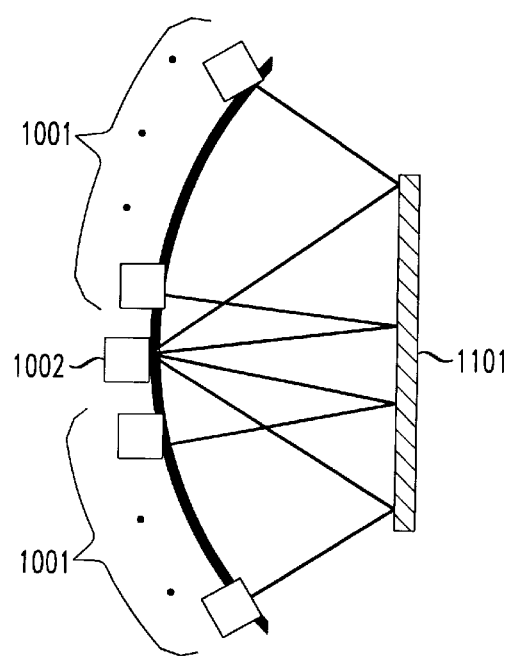
FIG. 11 shows a crossbar switch arrangement utilizing modular transmitter units, a folding mirror and a single receiver unit.

Shown in FIG. 11 is an arrangement including a folding mirror 1101. With the folded implementation, the receiver bundle would be located in a small area on the optical axis of the circular surface. Again if the transmitter module array is a two dimensional array then the transmitter modules would be located on a spherical surface and the receiver array located at the center of the sphere.

What has been described is merely illustrative of the application of the principles of the present invention. Other arrangements and methods can be implemented by those skilled in the art without departing from the spirit and scope of the present invention.

We claim:

1. An N by M, where N and M>1, free-space optical signal switch arrangement comprising N optical signal transmitters each for outputting an optical signal, M optical signal receivers each for receiving an optical signal, N controllable optical signal steering units, each steering unit only being associated with a transmitter, for receiving an optical signal from that transmitter and for controlling to which of the M receivers that optical signal is directed.

2. The free-space optical signal switch arrangement of claim 1 further comprising a fixed optical unit, interposed between the N controllable optical signal steering units and the M receivers, for further directing each of a plurality of optical signals to their respective receivers.

3. The free-space optical signal switch arrangement of claim 2 wherein the fixed optical unit is a shared focusing lens.

4. The free-space optical signal switch arrangement of claim 2 wherein the fixed optical unit includes M optical focusing lenses for further directing each of the M optical signals to their respective receivers.

5. The free-space optical signal switch arrangement of claim 1 wherein a group of the M receivers each receiver including an optical fiber having a convex lens formed on its receiving end to direct a received optical signals to the optical fiber.

6. The free-space optical signal switch arrangement of claim 1 wherein the transmitted optical signal is a single mode signal and wherein one of the M receivers receives multimode signals.

7. The free-space optical signal switch arrangement of claim 1 wherein one or more of the N transmitters is selected from a group of optical signal sources including at least a single mode fiber, a multimode fiber, a laser or a light emitting diode.

8. The free-space optical signal switch arrangement of claim 1 wherein one or more of the M receivers is selected from a group of optical signal units including at least a single mode fiber, a multimode fiber or an optical signal detector.

9. The free-space optical signal switch arrangement of claim 1 wherein the transmitter and optical signal steering unit combination is selected, respectively, from a group including at least (1) a fixed light source and tilting mirror, (2) a fixed light source and rotating prism, (3) a tiltable light source and lens combination, (4) a light source that is laterally translatable with regards to a fixed lens, or (5) a fixed light source and laterally translatable lens.

10. The free-space optical signal switch arrangement of claim 1 wherein the N transmitters and M receivers are, selected from a group including (1) single mode transmitter and receiver, (2) single mode transmitters and multimode receivers, (3) multimode mode transmitters and single mode receivers, or (4) multimode mode transmitters and multimode receivers.

11. The free-space optical signal switch arrangement of claim 1 further comprising an optical folding mirror, located to reflect the optical signals received from the N controllable optical steering units to the fixed optical unit.

12. The free-space optical signal switch arrangement of claim 1 where the ratio of M to N is selected from a group including (1) equal to one, or (2) greater than one.

13. The free-space optical signal switch arrangement of claim 1 being modular wherein the M transmitters are arranged into a plurality of modular transmitter groups, each transmitter of each transmitter group being arranged so that its respective optical signal steering unit enables that transmitter to transmit its optical signal to any of the M receivers.

14. An N by M, where N and M>1, free-space optical signal switch arrangement comprising N optical signal transmitters each for outputting a single mode optical signal, M optical signal receivers each for receiving a multimode optical signal, N controllable optical signal steering units each steering unit only being associated with a transmitter, for receiving a single mode optical signal from that transmitter and for controlling to which of the M receivers that single mode optical signal is directed.

15. The free-space optical signal switch arrangement of claim 14 further comprising a fixed optical unit, interposed between the N controllable optical signal steering units and the M receivers, for further directing each of a plurality of optical signals to their respective receivers.

* * * * *